United States Patent
Hart et al.

[11] Patent Number: 6,054,158
[45] Date of Patent: Apr. 25, 2000

[54] MAGNIFYING LOLLIPOP

[75] Inventors: Daniel G. Hart, Hermosa Beach; Gary D. Weiss, San Pedro, both of Calif.

[73] Assignee: Candy Novelty Works Ltd., Kowloon, The Hong Kong Special Administrative Region of the People's Republic of China

[21] Appl. No.: 09/102,787

[22] Filed: Jun. 23, 1998

[51] Int. Cl.$^7$ ..................................................... A23G 3/00
[52] U.S. Cl. ........................... 426/134; 426/104; D1/104; 446/391; 446/73
[58] Field of Search ............................. 426/134, 91, 104; D1/105, 104, 103, 102, 108, 109, 127; 446/391, 72, 390, 73; 472/63, 58, 70

[56] References Cited

U.S. PATENT DOCUMENTS

| D. 232,330 | 8/1974 | Cappadona | 426/104 |
|---|---|---|---|
| 1,502,006 | 7/1924 | Alvord | 426/104 |
| 1,586,137 | 5/1926 | Zanath | 426/104 |
| 1,746,839 | 2/1930 | Main et al. | 446/100 |
| 2,469,589 | 5/1949 | Barricini . | |
| 2,617,324 | 11/1952 | Brody | 426/104 |
| 2,821,481 | 1/1958 | Moslo . | |
| 3,782,194 | 1/1974 | Brodie et al. . | |
| 3,935,743 | 2/1976 | Brodie et al. . | |
| 3,968,262 | 7/1976 | Hodska | 426/104 |
| 4,001,440 | 1/1977 | Hoyt | 426/110 |
| 4,668,523 | 5/1987 | Begleiter | 426/104 |
| 5,066,502 | 11/1991 | Eales | 426/75 |
| 5,324,527 | 6/1994 | Coleman | 426/110 |
| 5,370,884 | 12/1994 | Coleman | 426/110 |

FOREIGN PATENT DOCUMENTS

| 77473 | 4/1954 | Denmark | 426/134 |
|---|---|---|---|
| 447733 | 9/1991 | European Pat. Off. | 426/134 |
| 488447 | 6/1992 | European Pat. Off. | 426/134 |
| 3617093 | 10/1986 | Germany | 426/134 |

*Primary Examiner*—Steven Weinstein
*Attorney, Agent, or Firm*—Joan H. Pauly

[57] ABSTRACT

A lollipop has a stem configured to represent a creature, which may be a distorted monster. A gripping portion of the stem extends between a lower base and an upper head portion. The upper head portion is surrounded by a body of candy that makes the actual size of the head portion appear to be larger. The base preferably has a flat bottom surface to enable the lollipop and/or stem to stand by itself on a flat support surface. The body of candy is preferably spherical with a reduced diameter lower cylindrical portion.

15 Claims, 3 Drawing Sheets

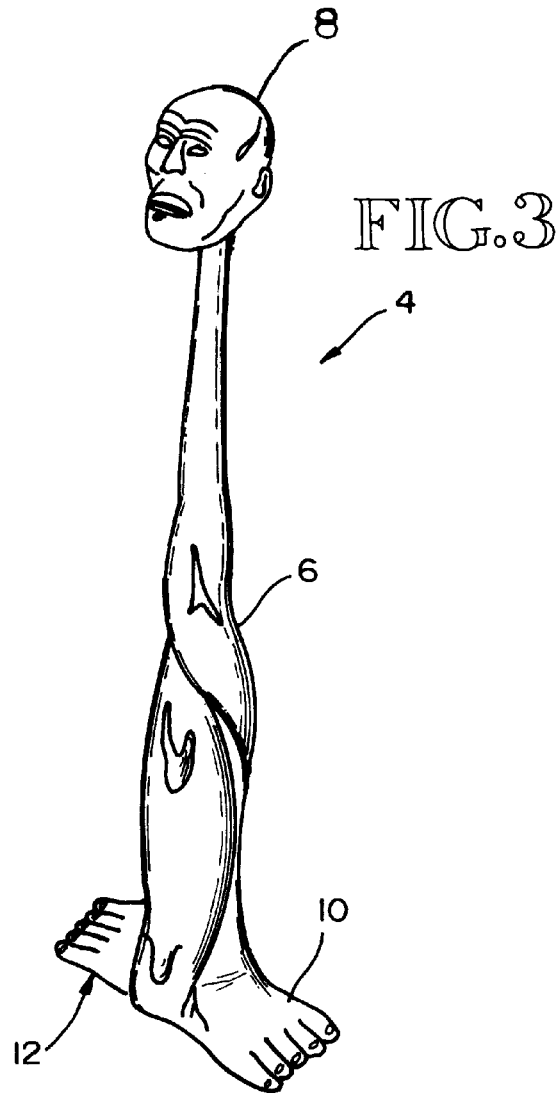
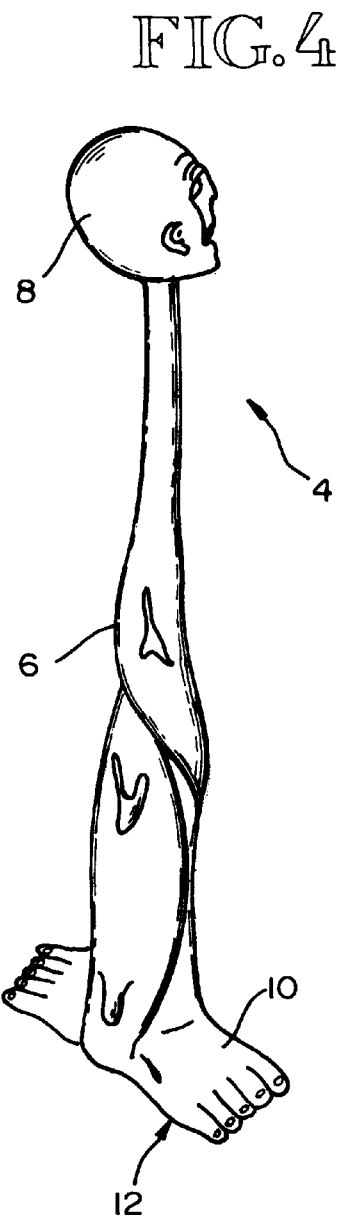
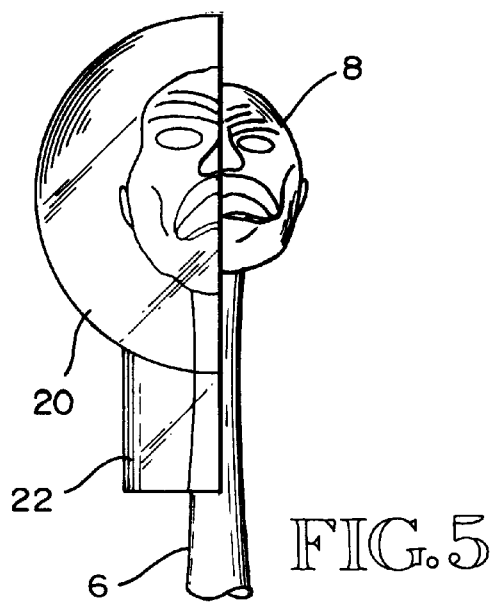

6,054,158

MAGNIFYING LOLLIPOP

TECHNICAL FIELD

This invention relates to novelty lollipops and, more particularly, to a lollipop having a stem configured to represent a creature with a lower gripping portion and an upper head portion, and a body of candy surrounding the head portion and being refractive to cause the head portion to appear to be larger than its actual size.

BACKGROUND OF THE INVENTION

Lollipops in their basic form have been well-known for at least several decades. The conventional basic form of a lollipop is a thin usually cylindrical cardboard stick which has a piece of hard candy attached to one end. In known lollipops, the candy may be substantially spherical, disk-like or various other shapes. The candy is eaten by a person holding the stick to position the candy in the mouth for licking and/or biting. Once the candy has been consumed, the stick is discarded.

SUMMARY OF THE INVENTION

The subject of the invention is a novelty lollipop comprising a stem configured to represent a creature and a body of candy. The stem has a lower gripping portion and an upper head portion with an actual size. The body of candy surrounds the head portion. The body is translucent to allow the head portion to be visible through the body. It is also refractive to cause the head portion to have an apparent size to an observer that is larger than the actual size.

It is within the scope of the invention for the body of candy to be formed from various types of candy. However, the body is preferably formed of a conventional type of hard candy. Also preferably, the hard candy or other type of candy forming the body is of a character that will cause the apparent size of the head portion to be at least about twenty-five percent larger than the actual size.

Although the term "head portion" is used herein to indicate the end portion of the stem which the body of candy surrounds, the head portion need not be a representation of a head of a creature. In some embodiments of the invention currently anticipated, the head portion does represent a head of a creature, but in other embodiments the head portion represents another portion of the creature, such as a fist of the creature. Whatever the particular form of the head portion, the creature is preferably a distorted monster to increase its appeal to children.

Another preferred feature of the invention is a lower base on the stem opposite the head portion. The base has a flat bottom surface to enable the stem to stand by itself on a flat support surface after the candy has been eaten. The flat bottom surface may be large enough to enable the entire lollipop to stand by itself before the candy is eaten. Also preferably, the stem is sufficiently durable to provide a novelty sculpture after the candy has been eaten. In the preferred embodiments, the stem is formed of molded plastic. In embodiments including both a durable stem and a flat bottom surface on the stem, the sculpture can stand by itself on a flat support surface after the candy is eaten and provide a child or other owner with a durable and possibly amusing toy that can be kept for an indefinite period of time.

The shape of the body of candy-may be varied as long as it provides the desired magnification of the observed size of the head portion. In its preferred form, the body of candy includes an upper substantially spherical portion surrounding the head portion of the stem. The spherical portion has a first diameter. The body of candy also has a substantially cylindrical neck portion extending downwardly from the spherical portion around the stem. The neck portion has a second diameter smaller than the first diameter. This feature provides a more gradual interface between the magnified head portion of the stem and the fully visible gripping portion of the stem to increase the effectiveness of the illusion. It also facilitates the eating of the body of candy by allowing a child to position the spherical portion in his mouth without requiring his lips to come into direct contact with the stem.

In general, the invention provides a child with a treat that satisfies a desire for candy. At the same time, it provides amusement resulting from observation of the monstrous creature and the apparent shrinking of the head portion as the body of candy becomes smaller during eating. In addition, the preferred embodiments provide a durable toy that can be played with and displayed over an extended period of time.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 3 is a pictorial view of the stem shown in FIG. 1 without the body of candy.

FIG. 4 is like FIG. 3 except that it shows the stem in the position shown in FIG. 2.

FIG. 5 is a fragmentary front elevational view of the upper portion of the lollipop shown in FIGS. 1 and 2 with one half of the body of candy cut away to illustrate the change in the apparent size of the head portion caused by the presence of the body of candy.

BEST MODE FOR CARRY PUT THE INVENTION

Figure 1:
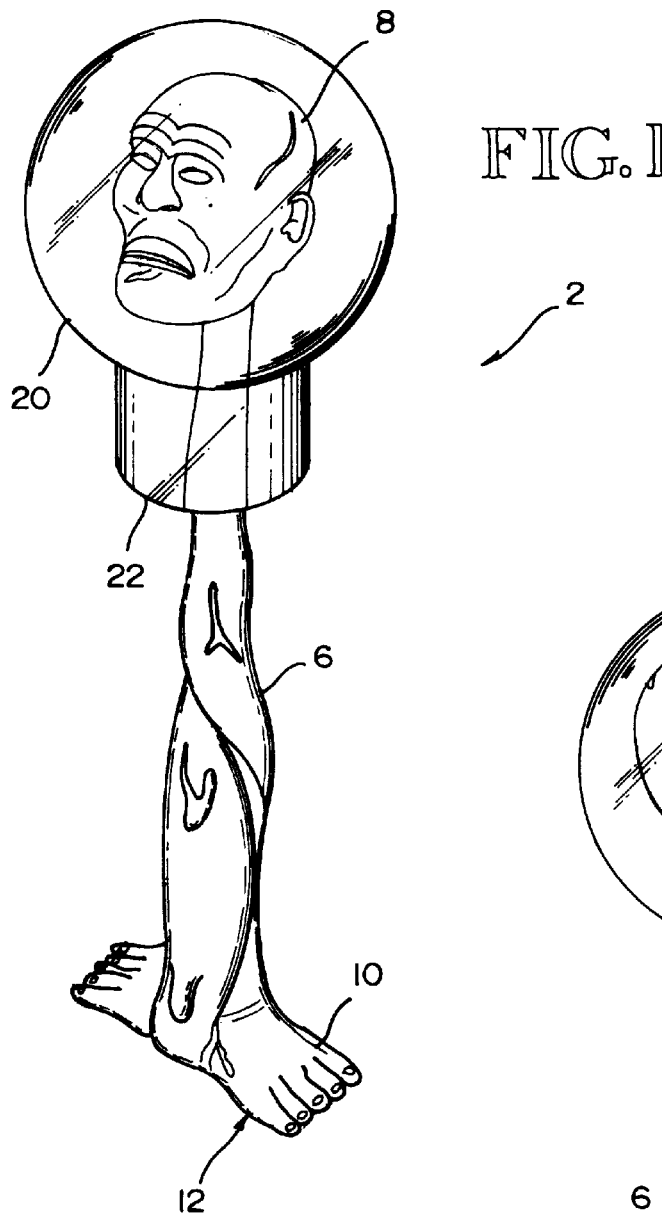
FIG. 1 is a pictorial view of a preferred embodiment of the invention having a first stem configuration.

The drawings show two lollipops that represent the best mode of the invention currently known to the applicant. In the drawings, two stem configurations are shown. These are only two of the virtually limitless number of configurations that may be included in the preferred embodiment of the invention. Preferably, the stem configuration represents a distorted monster, as in the two examples shown in the drawings. However, it is intended to be understood that a more realistic representation of a creature, including a human, may also be employed as the stem configuration without departing from the spirit and scope of the invention.

Figure 7:
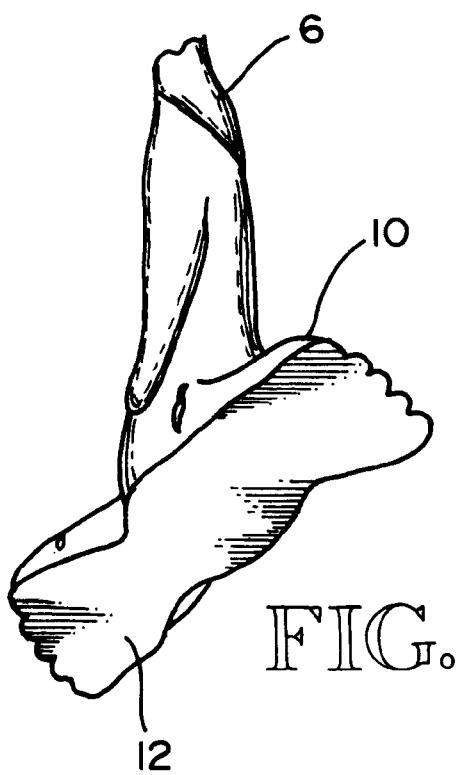
FIG. 7 is a fragmentary pictorial view looking toward the bottom of the stem shown in FIGS. 1–4.

Referring to FIGS. 1–5, the lollipop 2 shown therein includes a stem 4 having a lower gripping portion 6 and an upper head portion 8. In accordance with the preferred embodiment of the invention, the stem 4 also has a lower base 10 opposite the head portion 8. The base 10 has a flat bottom surface 12, best seen in FIG. 7. A body of candy 20 surrounds the head portion 8. The lower gripping portion 6 of the stem 4 extends between the base 10 and the head portion 8 and is elongated to allow it to be gripped by a person desiring to eat the body of candy 20.

Figure 2:
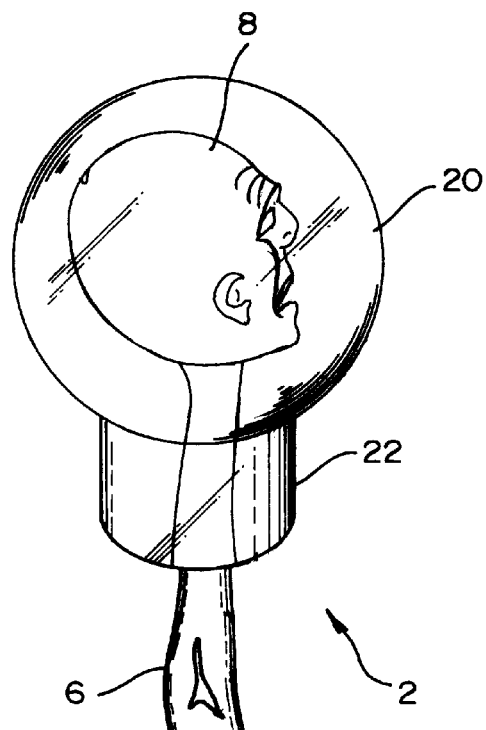
FIG. 2 is like FIG. 1 except that it looks toward the opposite or rear face of the lollipop.

The head portion 8 has an actual size that can be seen in FIGS. 3–5. The body of candy is translucent to allow the head portion 8 to be visible through the body 20 before the candy is eaten. The body is also refractive to cause the head portion 8 to have an apparent size to an observer that is larger than the actual size. The apparent size is illustrated in FIGS. 1, 2, and 5. As the candy is eaten, the apparent size shrinks as the head portion 8 becomes more and more clearly visible. In the preferred embodiment, the apparent size before consumption of the candy is commenced is at least about twenty-five percent larger than the actual size. This relationship between the actual and apparent size is illustrated in FIG. 5, in which one half of the body of candy 20 is omitted for a side-by-side comparison of a fully visible half of the head portion 8 and a refracted image of the other half of the head portion 8.

As noted above, the body of candy may be formed from various types of candy. The candy is preferably a conventional type of hard candy which has the desired refractive characteristics. The stem may also be formed from various materials. Preferably, the stem is made from a material that is sufficiently durable to make the stem suitable as a novelty sculpture once the candy has been consumed. In the preferred embodiment, the stem is made of molded plastic.

Preferably, the flat bottom surface 12 of the base 10 is sized so that the stem can stand by itself on a flat support surface after the candy has been eaten. When this feature is combined with the feature of a durable stem, the stem thereby provides a free standing novelty sculpture that can be enjoyed long after the candy has been consumed. The base configuration of the stem may be chosen so that the lollipop is able to stand by itself on a flat support surface even before the candy is consumed.

The configuration of the body of candy 20 may also be varied. In the illustrated preferred embodiment, the body of candy 20 has an upper substantially spherical portion surrounding the head portion 8 of the stem 4. A substantially cylindrical neck portion 22 extends downwardly from the spherical portion around the stem 4. The diameter of the upper spherical portion is larger than the diameter of the lower neck portion 22. As described above, this provides a gradual interface to increase the effectiveness of the magnifying illusion and also facilitates the eating of the candy.

Figure 6:
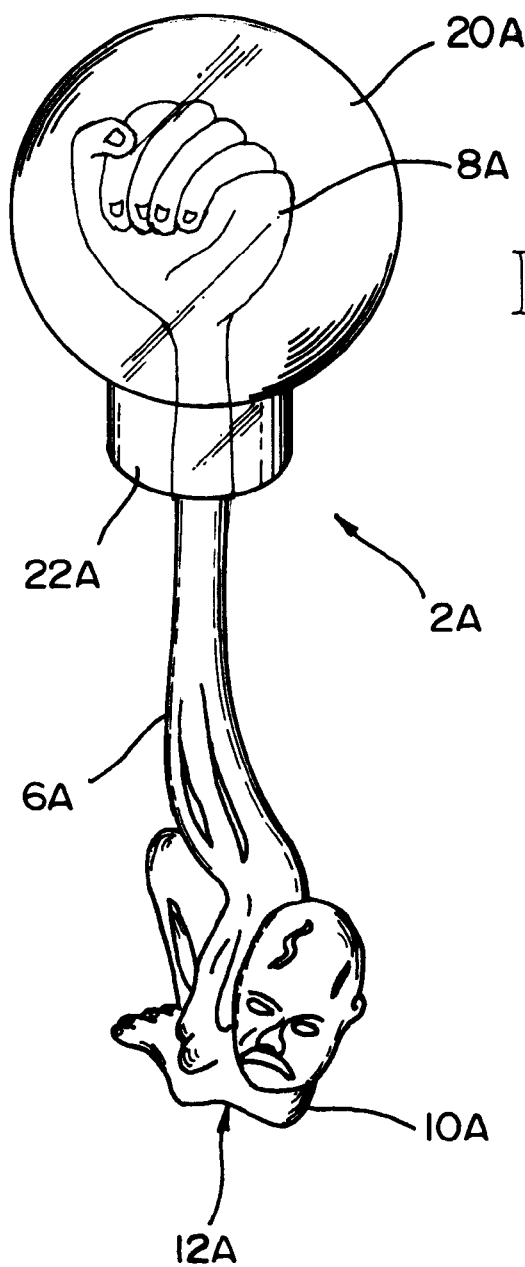
FIG. 6 is like FIG. 1 except that it shows a second stem configuration.

The head portion of the lollipop of the invention may be formed by various parts of the creature represented by the stem. In the stem configuration shown in FIGS. 1–5, the head portion 8 is a representation of a literal head of the creature. FIG. 6 shows another stem configuration in which the head portion 8A is a fist of the creature. The lollipop 2A shown in FIG. 6 has the same elements as that shown in FIGS. 1–5. The major difference between the two embodiments is the configuration of the stem. Referring to FIG. 6, the stem shown therein has a gripping portion 6A and a lower base 10A with a bottom flat surface 12A. A body of candy 20A surrounds the upper fist-shaped head portion 8A. The body of candy 20A has an upper spherical portion and a neck portion 22A extending downwardly therefrom around the stem.

As used herein, the terms "upper", "lower", "downwardly", and the like refer to the orientation of the lollipop shown in the drawings. The use of these terms is for the purposes of illustration and to aid in the description of the invention. It is not intended to in any way limit the scope of the invention. It is intended to be understood that the lollipop of the invention may be consumed and/or displayed in various orientations including but not limited to the orientation shown in the drawings.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A novelty lollipop comprising:
   a stem shaped to represent a creature, said stem comprising a lower gripping portion shaped to represent a part of the creature and an upper head portion, said head portion shaped to represent another part of the creature and having an actual size; and
   a body of candy surrounding said head portion; said body being translucent to allow said head portion to be visible through said body and to be visibly a part of said creature, and said body being refractive to cause said head portion shaped to represent said another part of the creature to be magnified to have an apparent size to an observer that is larger than said actual size.

2. The lollipop of claim 1, in which said body is formed of hard candy.

3. The lollipop of claim 2, in which said apparent size is at least about twenty-five percent larger than said actual size.

4. The lollipop of claim 1, in which said apparent size is at least about twenty-five percent larger than said actual size.

5. The lollipop of claim 1, in which said head portion has a shape representing a head of said creature.

6. The lollipop of claim 1, in which said head portion has a shape representing a fist of said creature.

7. The lollipop of claim 1, in which said creature is a distorted monster.

8. The lollipop of claim 1, in which said stem has a lower base opposite said head portion, said base having a flat bottom surface to enable the lollipop to stand by itself on a flat support surface.

9. The lollipop of claim 8, in which said stem is formed of molded plastic to provide a novelty sculpture after said body of candy has been eaten.

10. The lollipop of claim 1, in which said stem is formed of molded plastic to provide a novelty sculpture after said body of candy has been eaten.

11. The lollipop of claim 1, in which said stem has a lower base opposite said head portion; said base having a flat bottom surface, and said stem being sufficiently durable, to provide, after said body of candy has been eaten, a novelty sculpture that can stand by itself on a flat support surface.

12. The lollipop of claim 1, in which said body of candy includes an upper substantially spherical portion surrounding said head portion of said stem and having a first diameter, and a substantially cylindrical neck portion extending downwardly from said spherical portion around said stem and having a second diameter smaller than said first diameter.

13. The lollipop of claim 12, in which said body is formed of hard candy.

14. The lollipop of claim 13, in which said apparent size is at least about twenty-five percent larger than said actual size.

15. The lollipop of claim 12, in which said apparent size is at least about twenty-five percent larger than said actual size.

* * * * *